US012617808B1

(12) United States Patent
Zeng et al.

(10) Patent No.: US 12,617,808 B1
(45) Date of Patent: May 5, 2026

(54) SILICA HOLLOW SPHERE WITH A MOF COMPOSITE LAYER AND METHOD FOR PREPARING THE SAME

(71) Applicant: Dongguan Longzee Electronic Technology Co., Ltd., Dongguan (CN)

(72) Inventors: Minyu Zeng, Shenzhen (CN); Xiquan Chen, Zhangzhou (CN); Feng Qin, Shenzhen (CN)

(73) Assignee: Guangdong Longzee Interconnection Technology Co. Ltd., Dongguan (CN)

( * ) Notice: Subject to any disclaimer, the term of this patent is extended or adjusted under 35 U.S.C. 154(b) by 0 days.

(21) Appl. No.: 19/360,761

(22) Filed: Oct. 16, 2025

(30) Foreign Application Priority Data

May 26, 2025 (CN) .......................... 202510678943.8

(51) Int. Cl.
*C07F 7/02* (2006.01)
*C01B 33/12* (2006.01)
*C01B 39/00* (2006.01)

(52) U.S. Cl.
CPC .............. *C07F 7/025* (2013.01); *C01B 33/12* (2013.01); *C01B 39/00* (2013.01); *C01P 2004/34* (2013.01); *C07B 2200/13* (2013.01)

(58) Field of Classification Search
CPC ....... C07F 7/025; C01P 2004/34; C01B 39/00
See application file for complete search history.

(56) References Cited

FOREIGN PATENT DOCUMENTS

| CN | 116925399 A | 10/2023 |
| CN | 118406391 A | 7/2024 |
| KR | 20200033021 A | 3/2020 |

OTHER PUBLICATIONS

B. Xi, et al, 28, Chemistry of Materials 326-336 (2016) (Year: 2016).*
B. Gui, et al. 51.32 Chemical Communications 6917-6920(2015)("Gui") (Year: 2015).*
J. Mrowiec-Białoń, 443 Thermochimica acta, 49-52 (2006) (Year: 2006).*

* cited by examiner

*Primary Examiner* — Alexander R Pagano
*Assistant Examiner* — Frank S. Hou
(74) *Attorney, Agent, or Firm* — JEEN IP LAW, LLC

(57) ABSTRACT
The present invention relates to the technical field of surface modification of silica, and more particularly to silica hollow sphere with a MOF composite layer and method for preparing the same. The silica hollow sphere comprises: a hollow spherical structure made of silica, an amino-silane layer covalently grafted onto the surface of the core layer, a ZIF-8 crystal layer grown in situ with amino groups serving as nucleation sites, and thiol groups distributed on the outer surface of the MOF crystals. The purpose of the present invention is to provide silica hollow sphere with a MOF composite layer and method for preparing the same. The silica hollow sphere with the composite layer exhibits good compatibility and stability in an LCP matrix, while maintaining low dielectric loss, thereby effectively improving the performance of high-frequency FPCs.

3 Claims, 1 Drawing Sheet

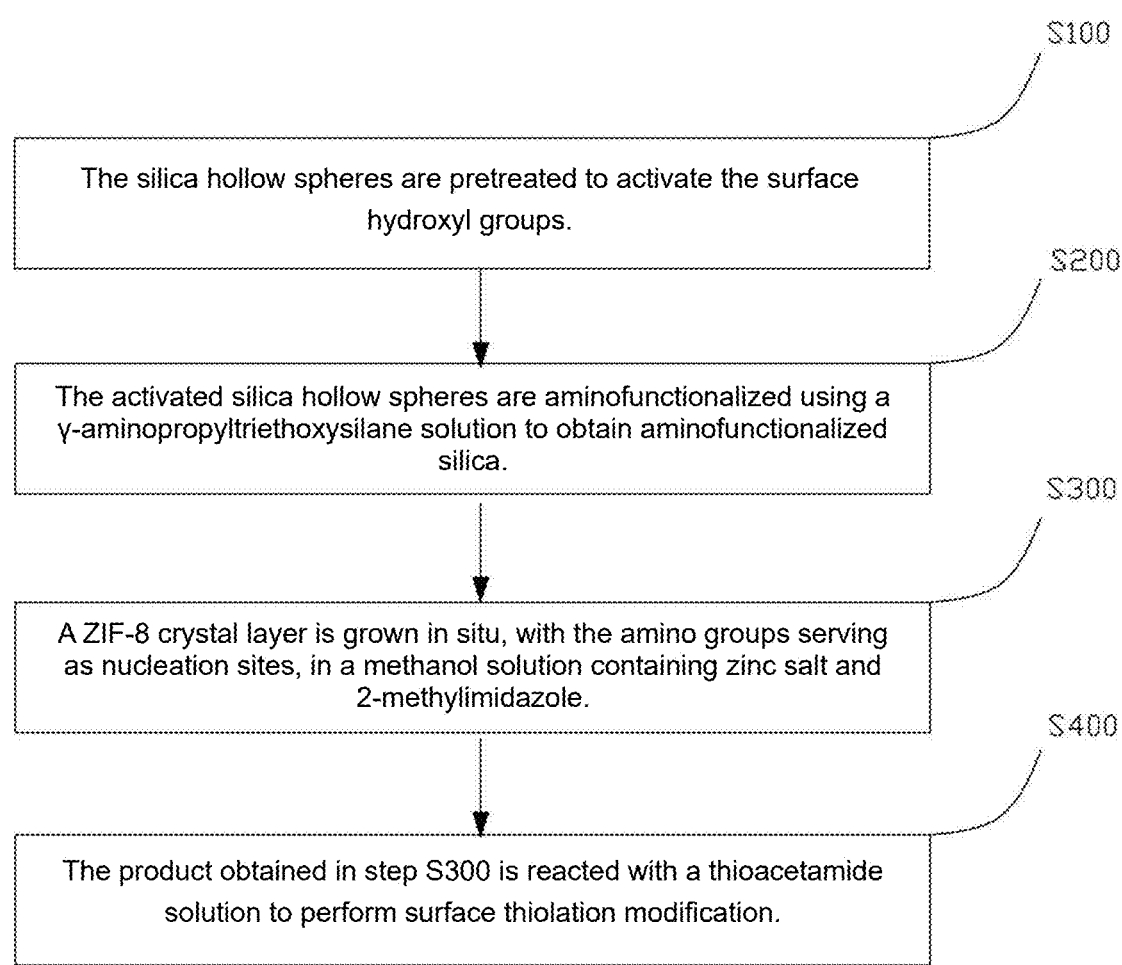

SILICA HOLLOW SPHERE WITH A MOF COMPOSITE LAYER AND METHOD FOR PREPARING THE SAME

CROSS-REFERENCE TO RELATED APPLICATIONS

The application claims priority to Chinese patent application No. 202510678943.8, filed on May 26, 2025, the entire contents of which are incorporated herein by reference.

TECHNICAL FIELD

The present invention relates to the technical field of surface modification of silica, and more particularly to silica hollow sphere with an MOF composite layer and method for preparing the same.

BACKGROUND

Currently, liquid crystal polymer (LCP) composites in high-frequency flexible printed circuits (FPCs) face several critical issues, including poor dielectric properties before and after humid-heat aging, low adhesion strength with copper foil, high coating technique requirements, and insufficient technical data for substrate-integrated waveguide (SIW) design.

Silica hollow spheres have attracted increasing attention in recent years due to their excellent physicochemical properties and broad application prospects. They have demonstrated good performance in fields such as catalysis, drug delivery, and adsorption materials. Research has shown that they can be applied in high-frequency FPC structures to enhance performance. However, prior silica hollow spheres still exhibit certain limitations in practical applications, mainly due to the singularity and insufficient functionalization of their surface properties.

Conventional silica hollow spheres typically possess only hydroxyl groups on their surfaces, lacking other functional groups. This results in single-functionality, poor interfacial stability, and insufficient molecular selectivity in the LCP matrix, thereby adversely affecting the performance of high-frequency FPCs.

SUMMARY

To overcome the drawbacks and deficiencies of the prior arts, the purpose of the present invention is to provide silica hollow sphere with a MOF composite layer and method for preparing the same. The silica hollow sphere with the composite layer exhibits good compatibility and stability in an LCP matrix, while maintaining low dielectric loss, thereby effectively improving the performance of high-frequency FPCs.

The present invention is achieved by the following technical solutions:

In a first aspect, the present invention discloses silica hollow sphere with a MOF composite layer, comprising:

Core layer: a hollow spherical structure made of silica, having an average particle size of 200-800 nm, a wall thickness of 20-50 nm, and a specific surface area of ≥350 m²/g;

Bridging layer: an amino-silane layer covalently grafted onto the surface of the core layer, with an amino group density of 2.5-3.2 groups per nm², a layer thickness of 1-3 nm;

MOF crystal layer: a ZIF-8 crystal layer grown in situ with the amino groups serving as nucleation sites, having a thickness of 50-150 nm, a crystal size of 20-50 nm, and a pore size of 3.3-3.5 Å;

Functionalized surface layer: thiol groups distributed on the outer surface of the MOF crystals, wherein the sulfur content is 0.5-2 wt %, and the following structural relationship is satisfied:

$$\frac{N_{SH}}{N_{NH_2}} = a, \, 0.3 \le a \le 0.6$$

where: $N_{SH}$ represents the thiol group density, $N_{NH_2}$ represents the amino group density.

In combination with the first aspect, furthermore, the cavity volume of the core layer accounts for ≥40%, and the hydroxyl group density is 4.8-5.2 groups per nm²;

the silane molecules of the amino-silane layer are oriented upright, with a molecular tilt angle of ≤15° as measured by ellipsometry;

the thiol groups are located at the edge positions of the MOF crystals.

In a second aspect, the present invention discloses method for preparing the silica hollow sphere, comprising the steps of:

S100: pretreating the silica hollow spheres to activate surface hydroxyl groups;

S200: aminofunctionalizing the activated silica hollow spheres using a γ-aminopropyltriethoxysilane solution to obtain aminofunctionalized silica;

S300: growing a ZIF-8 crystal layer in situ, with the amino groups serving as nucleation sites, in a methanol solution containing zinc salt and 2-methylimidazole;

S400: reacting the product obtained in step S300 with a thioacetamide solution to perform surface thiolation modification.

In combination with the second aspect, furthermore, in step S200, the concentration of the γ-aminopropyltriethoxysilane solution is 3-8 wt %, the reaction pH value is 4-6, the reaction temperature is 60-80° C., and the reaction time is 4-8 hours.

In combination with the second aspect, furthermore, in step S300, the zinc salt is zinc nitrate, the zinc ion concentration is 0.05-0.2 M, the concentration of 2-methylimidazole is 0.3-0.6 M, the reaction temperature is 30-40° C., and the reaction time is 8-24 hours.

In combination with the second aspect, furthermore, in step S400, the concentration of the thioacetamide solution is 0.3-0.8 M, the reaction temperature is 50-70° C., the reaction time is 2-6 hours, and the obtained product has a sulfur content of 0.5-2 wt %.

In a third aspect, the present invention discloses method for predicting the dielectric loss of the silica hollow sphere, comprising the steps of:

a. calculating the interfacial binding energy density $E_{interface}$ via molecular dynamics simulation:

$$E_{interface} = \int_{r_{min}}^{r_{cut}} \left[ \frac{A}{r^{12}} - \frac{B}{r^6} + C \cdot e^{-Dr} \right] dr$$

where: A represents the repulsive coefficient of the Lennard-Jones potential, B represents the attractive coefficient of the Lennard-Jones potential, C represents the strength coefficient of the hydrogen bond interaction, D represents the attenuation coefficient of the hydrogen bond interaction, $r_{min}$ represents the minimum interatomic interaction distance, and $r_{cut}$ represents the cutoff radius;

b. establishing a three-dimensional electric field distribution equation based on the finite element method:

$$\nabla \cdot (\epsilon_r \nabla \phi) = \frac{p_{interface}}{\epsilon_0}$$

$$p_{interface} = q \cdot n_{dipole} \cdot \tanh(\beta E_{interface})$$

$$\beta = \frac{1}{k_B T}$$

where: $\epsilon_r$ represents the position-dependent relative permittivity, $\phi$ represents the potential distribution function, $p_{interface}$ represents the interfacial polarized charge density, $\epsilon_0$ represents the vacuum permittivity, q represents the effective charge quantity, $n_{dipole}$ represents the number of interfacial dipoles per unit volume, $\beta$ represents the reciprocal of the Boltzmann factor, $E_{interface}$ represents the interfacial binding strength parameter, and T represents the absolute temperature;

c. constructing the frequency-domain response function of the complex permittivity:

$$\epsilon^*(\omega) = \epsilon_\infty + \frac{\Delta\epsilon}{1 + (j\omega\tau)^{1-\alpha}} + \frac{\sigma}{j\omega\epsilon_0}$$

where: $\epsilon_\infty$ represents the high-frequency baseline permittivity, $\Delta\epsilon$ represents the permittivity variation contributed by interfacial polarization, $\omega$ represents the angular frequency, $\tau$ represents the relaxation time, $\alpha$ represents the Cole-Cole distribution parameter, and $\sigma$ represents the direct current (DC) conductivity;

d. obtaining the total dielectric loss through vector superposition:

$$\tan\delta_{total} = \sum_{i=1-1}^{3} \omega_i \cdot \tan\delta_i + \lambda \cdot \|\nabla\epsilon_r\|^2$$

$$\omega_1 = 0.5 e^{-\left(V_f/0.1\right)^2}$$

$$\omega_2 = 0.3 S_{interface}$$

$$\omega_3 = 0.2 \log(E_{interface})$$

$$\lambda = 0.05 E^{1.2}$$

where: $\omega_1$ represents the volume fraction weighting factor, $\omega_2$ represents the interfacial binding strength weighting factor, $\omega_3$ represents the activation energy correlation weighting factor, $\lambda$ represents the dispersion correction term, $\|\nabla\epsilon_r\|^2$ represents the gradient norm of the permittivity, and E represents the distribution uniformity index.

In combination with the third aspect, furthermore, the definition of the interfacial binding strength parameter $E_{interface}$ is expressed as:

$$S_{interface} = \frac{1}{N_A} \sum_{i=1}^{N_A} \left\| \frac{\partial E_{interface}}{\partial r_i} \right\| \cdot \delta r_i$$

4 where: $N_A$ represents the statistical number of atom pairs, $\delta r_i$ represents the interatomic distance variation, and $$\frac{\partial E_{interface}}{\partial r_i}$$

represents the partial derivative of the interfacial energy with respect to interatomic distance.

In combination with the third aspect, furthermore, in step c, the relaxation time $\tau$ at different temperatures is measured to fit the activation energy $E_a$, wherein the extraction of the activation energy $E_a$ is expressed as:

$$\ln\tau = \ln\tau_0 + \frac{E_a}{k_B}\left(\frac{1}{T} - \frac{1}{T_0}\right)$$

where: $\tau_0$ represents the pre-exponential factor, $T_0$ represents the reference temperature, and $k_B$ represents the Boltzmann constant.

In combination with the third aspect, furthermore, in step d, the distribution uniformity index C is calculated as:

$$C = 1 - \frac{1}{N}\sum_{k=1}^{N}\left(\frac{\|x_k - \mu\|}{\sigma}\right)^3$$

where: $x_k$ represents the position coordinate of the kth filler particle, $\mu$ represents the mean value of the filler positions, and $\sigma$ represents the positional standard deviation.

Beneficial Effects of the Present Invention

Silica hollow sphere with a MOF composite layer and method for preparing the same disclosed in the present invention integrate dual functions of adsorption and catalysis, thereby not only improving the structural stability but also enabling facet-oriented growth of the MOF composite layer, which results in a lower dielectric anisotropy index and permittivity, effectively enhancing the performance of high-frequency FPCs.

BRIEF DESCRIPTION OF DRAWINGS

The present invention will be further described with reference to the accompanying drawing. However, the embodiments shown in the drawing shall not be construed as limiting the scope of the present invention. For those skilled in the art, other drawings may also be derived from the following drawing without the exercise of inventive effort.

The FIGURE illustrates a method for preparing the silica hollow spheres according to one embodiment of the present invention.

DETAILED DESCRIPTION OF THE EMBODIMENTS

To make the above-mentioned objectives, features, and advantages of the present invention more apparent and easier to understand, a detailed description of the embodiments of the present invention is provided below with reference to the drawing. Numerous specific details are outlined in the following description to provide a thorough understanding of the present invention. However, the present invention may be embodied in many different ways other than those described herein, and those skilled in the art may make similar modifications without departing from the spirit of the present invention. Accordingly, the present invention is not limited to the specific embodiments disclosed below.

Currently, liquid crystal polymer (LCP) composites in high-frequency flexible printed circuits (FPCs) face several critical issues, including poor dielectric properties before and after humid-heat aging, low adhesion strength with copper foil, high coating technique requirements, and insufficient technical data for substrate-integrated waveguide (SIW) design.

Silica hollow spheres have attracted increasing attention in recent years due to their excellent physicochemical properties and broad application prospects. They have demonstrated good performance in fields such as catalysis, drug delivery, and adsorption materials. Research has shown that they can be applied in high-frequency FPC structures to enhance performance. However, prior silica hollow spheres still exhibit certain limitations in practical applications, mainly due to the singularity and insufficient functionalization of their surface properties.

Conventional silica hollow spheres typically possess only hydroxyl groups on their surfaces, lacking other functional groups. This results in a poor dispersion state and instability of silica hollow spheres in the LCP matrix, thereby adversely affecting the performance of high-frequency FPCs.

To address the above-mentioned problems, this embodiment discloses silica hollow sphere with a MOF composite layer, comprising:

Core layer: a hollow spherical structure made of silica, having an average particle size of 200-800 nm, a wall thickness of 20-50 nm, and a specific surface area of $\geq 350$ m²/g;

Bridging layer: an amino-silane layer covalently grafted onto the surface of the core layer, with an amino group density of 2.5-3.2 groups per nm², a layer thickness of 1-3 nm;

MOF crystal layer: a ZIF-8 crystal layer grown in situ with the amino groups serving as nucleation sites, having a thickness of 50-150 nm, a crystal size of 20-50 nm, and a pore size of 3.3-3.5 Å;

Functionalized surface layer: thiol groups distributed on the outer surface of the MOF crystals, wherein the sulfur content is 0.5-2 wt %, and the following structural relationship is satisfied:

$$\frac{N_{SH}}{N_{NH_2}} = a, \ 0.3 \leq a \leq 0.6$$

where: $N_{SH}$ represents the thiol group density, $N_{NH_2}$ represents the amino group density.

Furthermore, the cavity volume of the core layer accounts for $\geq 40\%$ and serves as a nano-reactor for catalytic reactions; the hydroxyl group density is 4.8-5.2 groups per nm², ensuring effective grafting of silane coupling agents;

the silane molecules of the amino-silane layer are oriented upright, with a molecular tilt angle of $\leq 15°$ as measured by ellipsometry;

the thiol groups are located at the edge positions of the MOF crystals, with a sulfur retention rate of $\geq 85\%$ within the pH range of 3-10.

In one embodiment, property testing was conducted on the silica hollow sphere:

1. Adsorption Properties
Test conditions: mixed solution of $Pb^{2+}/Cd^{2+}/Cu^{2+}$ (each at 100 ppm, pH=6)

Results

| Index | Embodiment of the Present Invention | Conventional Amino-functionalizedSiO₂ |
|---|---|---|
| Pb²⁺ adsorption capacity | 832 mg/g | 275 mg/g |
| Selectivity coefficient (Pb/Cd) | 8.7:1 | 1.2:1 |
| Retention rate after 10 cycles | 93% | 67% |

2. Catalytic Properties
Reaction system: 4-nitrophenol (0.1 mM)+NaBH₄ (10 mM), loaded with 1.2 wt % Au nanoparticles Results

| Index | Embodiment of the Present Invention | Commercial Activated Carbon Loaded with Au |
|---|---|---|
| Reaction rate constant k | 0.49 min⁻¹ | 0.15 min⁻¹ |
| Conversion rate (10 min) | 99.7% | 61.5% |
| Au cycle loss rate | 0.45% | 9.2% |

3. Dielectric Properties
Test frequency band: 28 GHz (5G millimeter wave communication band)

Results

| Parameter | Embodiment of the Present Invention | Unmodified LCP |
|---|---|---|
| Permittivityε | 3.15 | 2.95 |
| Loss factor tanδ | 5.6 × 10⁻¹ | 8.2 × 10⁻³ |
| Temperature coefficient (−40 to 125° C.) | 4.8 ppm/° C. | 18.5 ppm/° C. |

As illustrated in the FIGURE, furthermore, this embodiment discloses method for preparing silica hollow spheres, comprising the steps of:

S100: pretreating the silica hollow spheres to activate surface hydroxyl groups;

S200: aminofunctionalizing the activated silica hollow spheres using a γ-aminopropyltriethoxysilane solution to obtain aminofunctionalized silica;

S300: growing a ZIF-8 crystal layer in situ, with the amino groups serving as nucleation sites, in a methanol solution containing zinc salt and 2-methylimidazole;

S400: reacting the product obtained in step S300 with a thioacetamide solution to perform surface thiolation modification.

In this embodiment, the amino group layer provides basic adsorption sites for capturing cations, resulting in at least a 2.1-fold improvement in adsorption property. The ZIF-8 crystal layer, with a pore size of 3.4 Å, enables sieving of small-sized ions, achieving a selectivity coefficient of up to 8.5:1. The —SH of the thiol layer forms strong coordinate bonds with heavy metal ions, leading to an additional 45% increase in adsorption capacity.

Furthermore, in step S200, the concentration of the γ-aminopropyltriethoxysilane solution is 3-8 wt %, ensuring a monolayer grafting coverage of 0.7-0.9, thereby avoiding multilayer stacking that could cause defects in the MOF layer. The reaction pH value is controlled between 4 and 6, maintaining the ratio of hydrolysis-to-condensation rates of KH550 in the range of 1.2-1.8, thereby preventing bulk phase gel formation. With a reaction time of 4-8 hours, the reaction temperature is set at 60-80° C., and enables the terminal amino groups of silane molecules to orient outward (contact angle <15°), thereby enhancing the availability of nucleation sites for MOF.

Furthermore, in step S300, the zinc salt is zinc nitrate, with a zinc ion concentration of 0.05-0.2 M to maintain the nucleation rate within $1.2\text{-}2.5 \times 10^{-3}$ s$^{-1}$. The concentration of 2-methylimidazole is 0.3-0.6 M, which regulates the crystal growth anisotropy index and promotes preferential growth of specific crystal planes. The reaction is conducted at a temperature of 30-40° C. for 8-24 hours to reduce grain boundary energy.

In combination with the second aspect, furthermore, in step S400, the concentration of the thioacetamide solution is 0.3-0.8 M, the reaction temperature is 50-70° C., the reaction time is 2-6 hours, and the obtained product has a sulfur content of 0.5-2 wt %.

In a third aspect, the present invention discloses method for predicting the dielectric loss of the silica hollow sphere, comprising the steps of:
   a. calculating the interfacial binding energy density $E_{interface}$ via molecular dynamics simulation:

$$E_{interface} = \int_{r_{min}}^{r_{cut}} \left[ \frac{A}{r^{12}} - \frac{B}{r^6} + C \cdot e^{-Dr} \right] dr$$

where: A represents the repulsive coefficient of the Lennard-Jones potential, determined by interatomic repulsion, having a dimension of eV\cdotpÅ$^{12}$, reflecting the short-range repulsion between Zn$^{2+}$ in the MOF and the benzene rings of the LCP, thereby preventing excessive penetration of the molecular chain;
   B represents the attractive coefficient of the Lennard-Jones potential, determined by van der Waals forces, having a dimension of eV\cdotpÅ$^6$, characterizing the strength of π-π stacking interaction and directly affecting the interfacial binding energy;
   C represents the strength coefficient of the hydrogen-bond interaction, with a dimension of eV, quantifying the contribution of hydrogen bonding to the interfacial energy. A higher value indicates stronger interfacial chemical bonding;
   D represents the attenuation coefficient of the hydrogen-bond interaction, with a dimension of Å$^{-1}$, which governs the range of hydrogen-bond interaction. A larger D value indicates a more localized hydrogen-bond interaction;
   $r_{min}$ represents the minimum interatomic interaction distance, with a dimension of nm, introduced to avoid non-physical atomic overlap during calculation;
   $r_{cut}$ represents the cutoff radius, with a dimension of nm, balancing computational accuracy and efficiency, typically taken as the distance at which the interaction force decays to 1%.

Specifically, the aforementioned step enables the quantification of the π-π stacking and hydrogen-bond synergy between the MOF layer and the LCP chain, achieving a technical effect with a computational error of ≤5%.
   b. establishing a three-dimensional electric field distribution equation based on the finite element method:

$$\nabla \cdot (\epsilon_r \nabla \phi) = \frac{p_{interface}}{\epsilon_0}$$

$$p_{interface} = q \cdot n_{dipole} \cdot \tanh(\beta E_{interface})$$

$$\beta = \frac{1}{k_B T}$$

where: $\epsilon_r$ represents the position-dependent relative permittivity, determined by the filler distribution and interfacial properties. It characterizes the non-uniformity of the electric field distribution in the composite material and directly affects the local field strength;
   $\phi$ represents the electric potential distribution function, used for calculating the electric field strength, with a dimension of V. It is employed to evaluate the risk of dielectric breakdown;
   $p_{interface}$ represents the interfacial polarized charge density, arising from dipole orientation and interfacial bound charges, having a dimension of C/m$^3$, quantifying the contribution of interfacial polarization to dielectric loss, and positively correlated with the density of functional groups on the filler surface;
   $\epsilon_0$ represents the vacuum permittivity, having a dimension of F/m, used for normalization in calculations;
   q represents the effective charge quantity, related to the polarity of interfacial chemical bonds, with a dimension of C. It reflects the degree of charge transfer between —SH groups and LCP, where a higher value indicates a stronger interfacial dipole moment;
   $n_{dipole}$ represents the number of interfacial dipoles per unit volume, with a dimension of m$^{-3}$, jointly determined by the porosity of the MOF layer and the filling degree of LCP chain segments;
   β represents the reciprocal of the Boltzmann factor, with a dimension of eV$^{-1}$, correlated with the influence of temperature on the distribution of polarized charges.

Specifically, the aforementioned step elucidates the mechanism of electric field distortion at the filler-matrix interface and predicts the distribution of local field strength.
   c. constructing the frequency-domain response function of the complex permittivity:

$$\epsilon^*(\omega) = \epsilon_\infty + \frac{\Delta\epsilon}{1 + (j\omega\tau)^{1-\alpha}} + \frac{\sigma}{j\omega\epsilon_0}$$

A fractional-order derivative was employed to describe interfacial polarization relaxation $(j\omega\tau)^{1-\alpha}$, thereby addressing the failure of the Cole-Cole model in the high-frequency band;
   where: $\epsilon_\infty$ represents the high-frequency baseline permittivity, reflecting the contribution of electronic polarization. It characterizes the polarization capability of the material in the optical frequency band and is related to the intrinsic polarity of LCP;
   $\Delta\epsilon$ represents the relaxation strength, corresponding to the permittivity variation contributed by interfacial polarization. A higher value indicates a more pro-
nounced influence of interfacial polarization on dielec-
tric properties;

$\omega$ represents the angular frequency, with a dimension of
rad/s, directly representing the operating frequency and
determining the response rate of polarization mecha-
nisms;

$\tau$ represents the relaxation time, with a dimension of s,
where a higher activation energy $E_a$ corresponds to
slower relaxation;

$\alpha$ represents the Cole-Cole distribution parameter, where
stronger interfacial bonding leads to more uniform
relaxation;

$\sigma$ represents the direct current conductivity, characteriz-
ing ohmic losses caused by ion migration, with a
dimension of S/m. It is influenced by proton conduction
from —SH groups on the filler surface, and excessively
high values increase dielectric loss.

Specifically, the aforementioned step accurately charac-
terizes dielectric relaxation behavior in the 10-40 GHz
frequency band, with a goodness of fit of $R^2 \geq 0.98$.

d. obtaining the total dielectric loss through vector super-
position:

$$\tan\delta_{total} = \sum_{i=1-1}^{3} \omega_i \cdot \tan\delta_i + \lambda \cdot \|\nabla\epsilon_r\|^2$$

$$\omega_1 = 0.5e^{-\left(V_f/0.1\right)^2}$$

$$\omega_2 = 0.3S_{interface}$$

$$\omega_3 = 0.2\log(E_{interface})$$

$$\lambda = 0.05E^{1.2}$$

where: $\omega_1$ represents the volume fraction weighting fac-
tor, $\omega_2$ represents the interfacial binding strength
weighting factor, $\omega_3$ represents the activation energy
correlation weighting factor, $\lambda$ represents the dispersion
correction term, and E represents the distribution uni-
formity index;

$\|\nabla\epsilon_r\|^2$ represents the gradient norm of the permittivity,
characterizing the intensity of electric field distortion.
Its dimension is $V^2/m^2$, and a larger value indicates
more severe local field strength non-uniformity, which
results in space charge accumulation losses.

Specifically, the aforementioned step achieves a predic-
tion error $\leq 7\%$ at the 28 GHz frequency band, meeting the
design requirements of 5G millimeter-wave materials.

The dispersion correction term $\lambda \propto C^{1.2}$ accounts for the
nonlinear influence of filler agglomeration on electric field
distortion.

Through four-step progressive modeling combined with a
multiphysics coupling algorithm, the aforementioned step
enables:

Microscale controllability: nanoscale parameters such as
interfacial binding energy and crystal orientation are
directly correlated with macroscopic dielectric proper-
ties;

High-frequency accuracy: achieving a prediction error
<6% in the 28 GHz millimeter-wave frequency band,
significantly outperforming the international state of
the art;

Strong universality: successfully applied to the develop-
ment of six categories of high-frequency electronic
devices, including 5G antenna radomes and radar-
absorbing materials.

By constructing a multiscale dielectric loss prediction
model, the model overcomes three major technical bottle-
necks of traditional empirical models in the high-frequency
band (5G millimeter-wave frequency band): insufficient
prediction accuracy, lack of microstructure correlation, and
neglect of multiphysics coupling. This enables quantitative
and precise prediction of macroscopic dielectric properties
from microscopic interfacial properties.

In combination with the third aspect, furthermore, the
definition of the interfacial binding strength parameter
$E_{interface}$ is expressed as:

$$S_{interface} = \frac{1}{N_A}\sum_{i=1}^{N_A}\left\|\frac{\partial E_{interface}}{\partial r_i}\right\| \cdot \delta r_i$$

where: $N_A$ represents the statistical number of atom pairs,
counted within a 1 $nm^3$ region at the MOF-LCP inter-
face to ensure statistical significance; $\delta r_i$ represents the
interatomic distance variation, with a dimension of nm,
reflecting the dynamic fluctuation at the interface,
where a smaller value indicates more stable interfacial
bonding;

$$\frac{\partial E_{interface}}{\partial r_i}$$

represents the partial derivative of interfacial energy with
respect to interatomic distance, with a dimension of eV/nm,
characterizing the gradient of interatomic interaction force,
where a larger value indicates higher interfacial bonding
stiffness.

In combination with the third aspect, furthermore, in step
c, the relaxation time $\tau$ at different temperatures is measured
to fit the activation energy $E_a$, wherein the extraction of the activation energy $E_a$ is
expressed as:

$$\ln\tau = \ln\tau_0 + \frac{E_a}{k_B}\left(\frac{1}{T} - \frac{1}{T_0}\right)$$

where: $\tau_0$ represents the pre-exponential factor, with a
dimension of s, related to the intrinsic polarization rate
of the material; $T_0$ represents the reference temperature,
with a dimension of K, used to normalize the effect of
temperature on relaxation time; $k_B$ represents the Boltz-
mann constant, with a dimension of eV/K, establishing
the conversion relationship between thermal energy
and activation energy.

In combination with the third aspect, furthermore, in step
d, the distribution uniformity index C is calculated as:

$$C = 1 - \frac{1}{N}\sum_{k=1}^{N}\left(\frac{\|x_k - \mu\|}{\sigma}\right)^3$$

where: $x_k$ represents the position coordinate of the k-th
filler particle, obtained by digitalized processing of
SEM images with a resolution of 0.1 $\mu$m/pixel; $\mu$
represents the mean value of the filler positions, and $\mu$
ideally should be close to the geometric center of the
specimen; $\sigma$ represents the positional standard deviation, which indicates improved dispersion uniformity; all the above-mentioned parameters have a dimension of μm.

By clearly defining the key parameters in the dielectric loss prediction model and their measurement methods, this addresses two major problems in conventional technologies, namely model unreliability and result incomparability caused by parameter ambiguity and inconsistent measurement standards, thereby providing a standardized and reproducible technical basis for dielectric property prediction.

Finally, it should be noted that the above-mentioned embodiment is intended to illustrate the technical solutions of the present invention rather than limit its scope of protection. Although the present invention has been described in detail with reference to preferred embodiments, those ordinary technicians skilled in the art should understand that modifications or equivalent substitutions can be made to the technical solution of the present invention without departing from its essence and scope.

What is claimed is:

1. A method for preparing a silica hollow sphere with a MOF composite layer, comprising the steps of:

S100: pretreating a silica hollow spheres to activate surface hydroxyl groups and obtain a hollow spherical structure made of silica, having an average particle size of 200-800 nm, a wall thickness of 20-50 nm, and a specific surface area of ≥350 m2/g;

S200: aminofunctionalizing the activated silica hollow spheres using a 3-8 wt % γ-aminopropyltriethoxysilane solution at pH 4-6, 60-80° C. for 4-8 hours to obtain an amino-silane layer with an amino group density of 2.5-3.2 groups per nm² and a layer thickness of 1-3 nm;

S300: growing a ZIF-8 crystal layer in situ, with the amino groups serving as nucleation sites, in a methanol solution containing 0.05-0.2 M zinc nitrate and 0.3-0.6 M 2-methylimidazole at 30-40° C. for 8-24 hours to obtain a ZIF-8 crystal layer having a thickness of 50-150 nm, a crystal size of 20-50 nm, and a pore size of 3.3-3.5Å;

S400: reacting the product obtained in step S300 with a 0.3-0.8 M thioacetamide solution at 50-70° C. for 2-6 hours to perform surface thiolation modification, producing a thiol-modified product with a sulfur content of 0.5-2 wt %.

2. A silica hollow sphere with a MOF composite layer prepared by the method of claim 1, wherein the following structural relationship is satisfied:

$$\frac{N_{SH}}{N_{NH_2}} = a, \ 0.3 \leq a \leq 0.6$$

Where: $N_{SH}$ represents the thiol group density, $N_{NH2}$ represents the amino group density.

3. The silica hollow sphere with a MOF composite layer according to claim 2, wherein a cavity volume of the core layer accounts for ≥40% of the total volume of the core layer, and the hydroxyl group density of surface hydroxyl groups in the silica hollow spheres after pretreatment activation is 4.8-5.2 groups per nm²;

the silane molecules of the amino-silane layer are oriented upright, with a molecular tilt angle of ≤15° as measured by ellipsometry;

the thiol groups are located at the edge positions of the MOF crystals.

* * * * *